A. B. RAGER.
TYMPAN BAIL AND GAGE.
APPLICATION FILED OCT. 16, 1914.
1,162,102.
Patented Nov. 30, 1915.
2 SHEETS—SHEET 1.
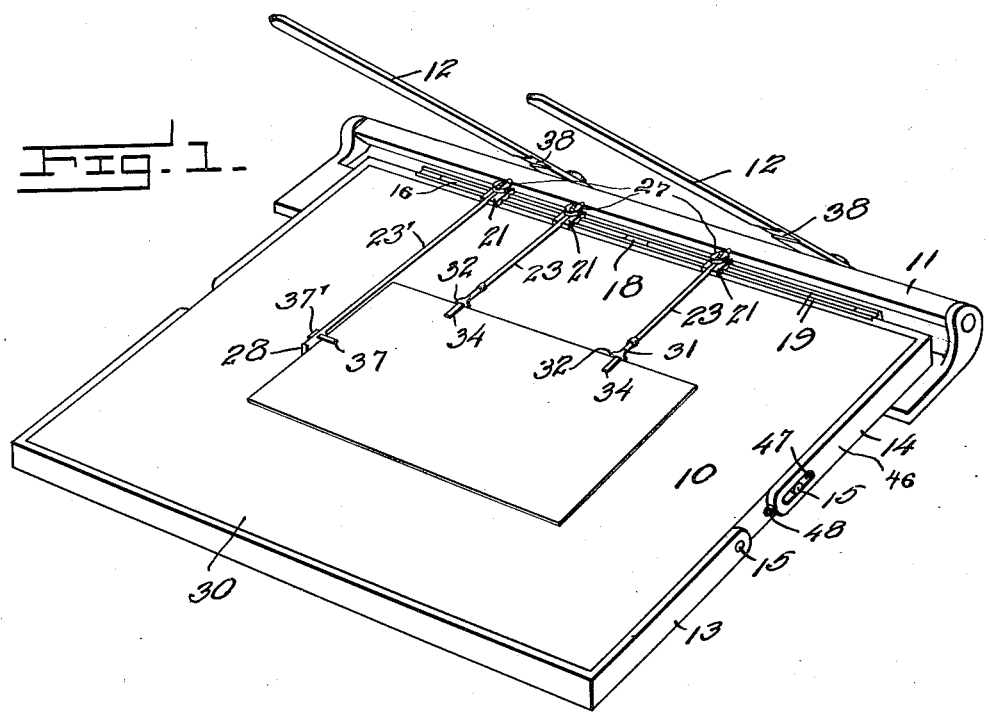
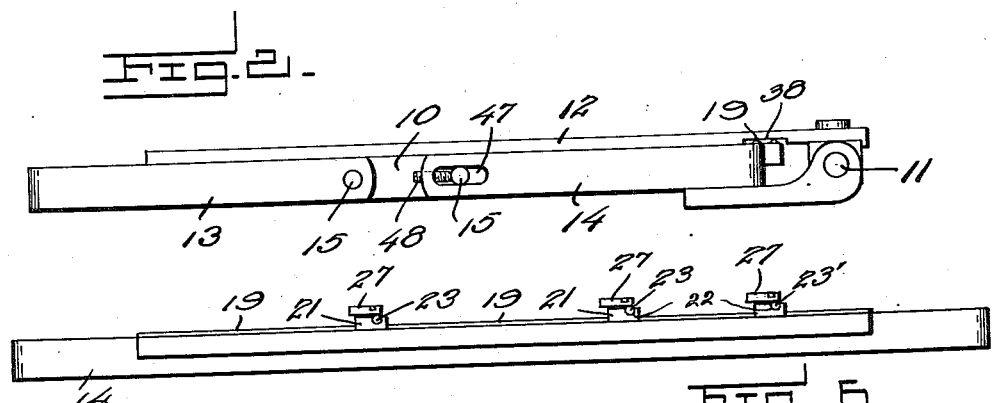
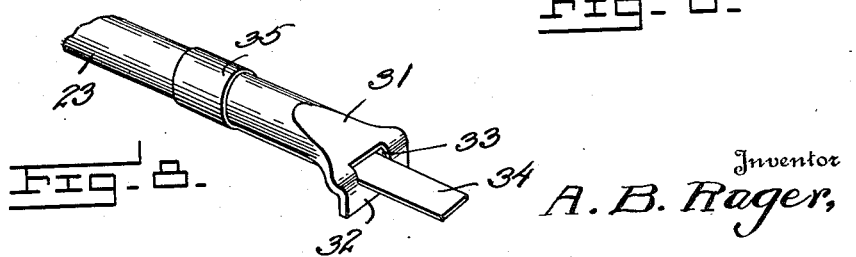
Witnesses
Chr. Nielsen, Jr.
O. N. Woodward
Inventor
A. B. Rager,
By H. L. Woodward
Attorney

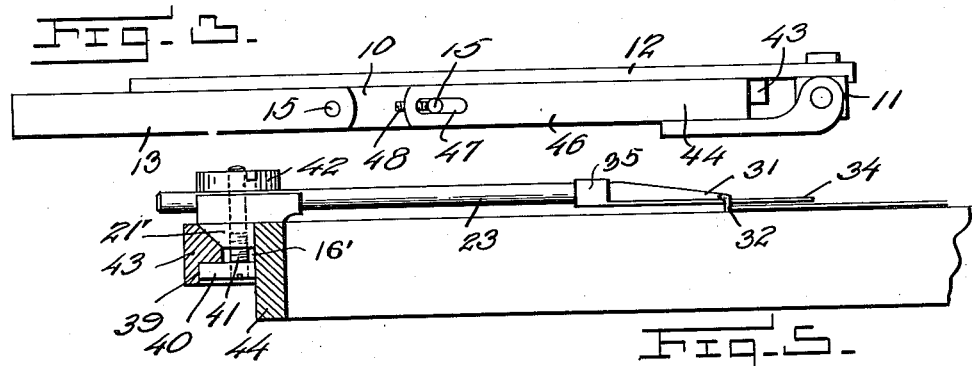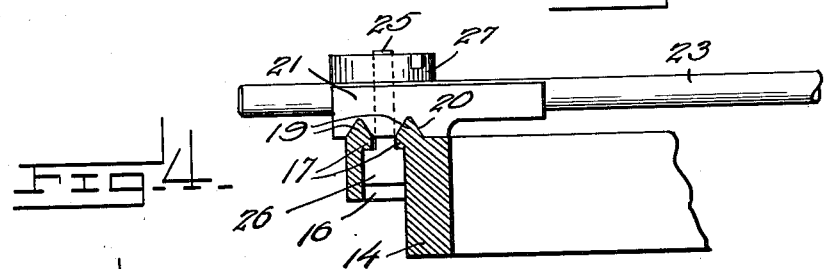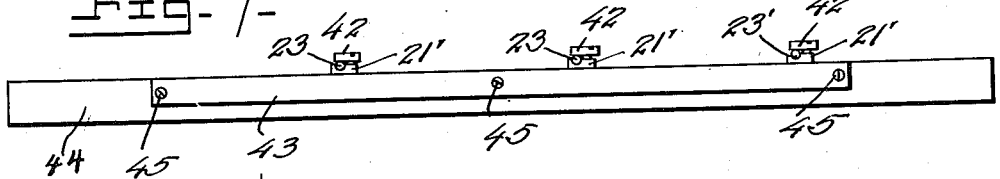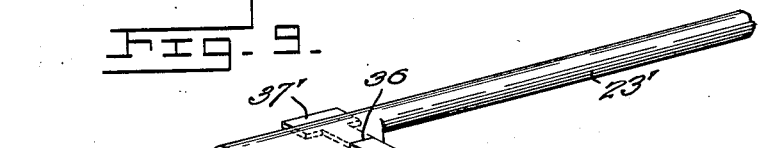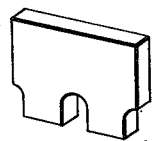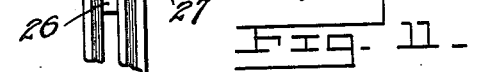

UNITED STATES PATENT OFFICE.

ARTHUR B. RAGER, OF YOUNGSTOWN, OHIO.

TYMPAN BAIL AND GAGE.

1,162,102.   Specification of Letters Patent.   Patented Nov. 30, 1915.

Application filed October 16, 1914.   Serial No. 866,967.

*To all whom it may concern:*

Be it known that I, ARTHUR B. RAGER, a citizen of the United States, residing at Youngstown, in the county of Mahoning and State of Ohio, have invented certain new and useful Improvements in Tympan Bails and Gages, of which the following is a specification.

The invention has for an object to provide a tympan fastening bail and gage combined, whereby, in one embodiment, the invention may be applied to ordinary job presses without structural changes or machine work thereon.

It is an important object to provide a tympan gage which will not mar the tympan, but will be adjustable in operative engagement therewith to any desired position.

It is a further important aim to give an end gage and side gages having similar mountings, simplifying the manufacture, and adjustment of the device.

It is another purpose to provide a simple means for securing the gages rigidly in adjusted positions, while yet permitting their rapid adjustment.

An end sought is the provision of simple adjustable means on the gage elements to obviate the necessity for grippers to hold work against the platen after the impression and which will also accommodate itself to furniture, etc., in the chase without damage.

Additional objects, advantages, and features of invention will appear from the combination, arrangement, and construction of parts hereinafter described, and shown in the drawings, wherein—

Figure 1 is a perspective view of a platen equipped with one embodiment of my invention, Fig. 2 is a side elevation thereof, showing the relation of the usual mechanical grippers thereto, if such are used, Fig. 3 is a similar view showing a different embodiment of the invention, Fig. 4 is a cross section of the bail in the first embodiment, Fig. 5 is a similar view of the second embodiment, Fig. 6 is a rear view of the bail, Fig. 7 is a similar view of the second embodiment, Fig. 8 is a detail of a side gage, Fig. 9 is a detail of the end gage, Fig. 10 is a perspective view of the tool for loosening the clamping device, Fig. 11 is a fragmentary plan view showing one of the sliding blocks and connected parts.

There is illustrated a portion of a job printing press, including the platen, 10, the gripper bar 11, the mounting of which may be of any customary form, the bar 11 carrying gripper arms 12 of usual form. The platen is provided with tympan bails 13 and 14 at the front and rear sides, mounted on the usual pins 15, at each side of the platen. The front bail 13 is of the ordinary form, and the rear one differs in having a longitudinal slot 16 formed therein for the greater part of its length, at the rear side of the platen, the bail being thickened at this part if necessary. The slot opens through the upper and lower sides of the bail, and is reduced in breadth at the upper side, forming the flange 17 on each side. A stiffening piece may be formed across the slot centrally of its length, as at 18. Two V-shaped ribs 19 run along respective sides of the slot on the upper side of the bail, being formed integrally thereon, and engaging in corresponding grooves 20 in sliding blocks 21 engaged thereover. These blocks may be oblong, as shown, arranged transversely of the slot 16, their outer ends closely adjacent the outer side of the bail, while their inner ends project a short distance inward. On their upper sides the blocks each have a longitudinal channel 22 close to one side in which there is set slidably a gage stem 23, fitted closely between the sides of the channel, but projecting slightly above the upper surface of the block. Centrally over the slot 16, each block is formed with an opening, spaced from the channel engaged slidably through which opening there is a threaded stem 25, carried by an anchor block 26 slidably engaged in the lower part of the slot 16 and fitted snugly therein to engage the flanges 17. The stems 25 project sufficiently above the blocks 21, to engage the clamping nuts 27, having slots across their upper sides to receive a thin flat instrument, such as shown in Fig. 10. The gage stem 23′ is engaged in the block 21 nearest the left hand side of the platen and is longer than the stems 23, which are engaged in the other blocks 21. It is formed with an elongated gage block 28 on its under side, having a flat under face resting firmly against the tympan 30, which is stretched over the platen and held by the bails 13 and 14 in the customary manner, and may be of any customary or suitable material. It is possible to use an expensive material economically, owing to the fact that my gages do not damage it, and by printing small jobs first at one side and then another of the platen, it is possible to avoid the need for underlays to compensate for wear, to a large extent.

The gage stems 23 form parts of gages 31 formed by the flattening of the ends of the stems, principally on the upper sides, the extremities being turned downwardly, forming stops 32 which rest upon the tympan. These stops are quite short, and do not extend above the tympan more than the thickness of the stems, which in practice have been made about $\frac{3}{16}$ of an inch in thickness. A transverse slot 33 is formed through the upper part of the stop 32 in line with the underside of the stem 23, and projected slidably therethrough there is a tongue 34 of thin metal, that customarily employed being about $\frac{1}{64}$ of an inch thick, and of flexible metal. This tongue extends beneath the stem 23 some distance, and is formed with lateral extensions turned upwardly and around the stem loosely, and secured together, thereby forming a collar 35 slidable upon the stem. The tongues are resilient and formed to bear upward against the side of the slot 33, so that they may be adjusted to any desired position and will be retained in adjusted position. The gage 28 has a slot 36 formed transversely therethrough, in which the tongue 37 is slidably engaged. This tongue is fitted snugly in the slot so as not to slide too easily, and is formed with an enlargement 37' on the outer end to check its inward adjustment.

The gripper arms may have a portion cut away from their under sides as at 38, if the ribs project above the level of the platen face, but the bail may be so proportioned as to fall below this level and obviate that necessity. Also, the slot 16 may be formed as at 16' in Fig. 5, in which the outer upper side is beveled, and the sliding block 21' is formed to fit snugly in the channel thus formed between the inner and outer sides of the slot, the block being otherwise the same as before described. In this construction the outer side of the slot is formed by a plate 43 (see Fig. 7) attached to the outer side of the bail proper 44, and beneath the beveled portion is recessed as at 39, so that the beveled portion forms a retaining flange for the block 40, which at the side next the bail is provided with the screw 41 engaged in the block 21' and held by the nut 42 thereover. The plate 43 is secured to the bail in any suitable manner, as by screws 45 at the ends and middle. This form of slot and flange may of course be made integrally with the bail if desired. The ribs 19 or the beveled slot side are essential to assure accuracy in adjustment for proper registry, as casual movement of the support of the gage is reduced to a minimum, and the only element to move or that will move bodily under adjustment normally is the gage and stem. When the parts become worn, there will be no liability of slipping of the block carrying the stem when the nut is loosened and the stem moved causing a greater displacement of the gage than intended.

The side arms 46 of the bail are formed with slots 47 receiving the pins 15, and engaged in the ends of the arms there are set screws 48 to engage the pins so that the bail may be adjusted to properly grip the tympan at all times, regardless of wear.

For small presses one set of gages may be all that is required for the full range of adjustment, but it is thought that in large presses the side gages might require to be furnished in several sizes, of which no more than three would be required, the lengths of the stems 23 being varied to permit the required positioning of the stops 32.

The tongues 34 and 37 may be adjusted so that their outer ends will fall closely beside the type, or even to project into the type body, between the lines, and owing to their thinness will not be damaged by, nor will they damage, the furniture or other parts of the form.

What is claimed:

1. A tympan bail and gage comprising a bail body, a longitudinal slot being formed therein, guide portions formed beside the slot having convergent surfaces, a sliding block having similarly converged surfaces snugly engaged with those of the guide portions, a screw member having an enlarged head engaged beneath the slot, the screw member being engaged slidably through said block, a channel across the block transversely of the slot, a nut engaged with the screw member and projecting closely over the channel, and a gage member having a stem slidably engaged in the channel and lying partly thereabove.

2. A tympan bail and gage comprising a bail body, a longitudinal slot formed therein having upwardly divergent sides and laterally enlarged therebeneath, a sliding block having convergent sides fitting snugly those of the slot, a sliding member engaged snugly in the enlarged part of the slot, a screw member carried thereby engaged slidably through the block, a transverse channel in the block, a gage having a stem slidable in the channel and lying partly thereabove, and a nut on the screw member above the said block.

3. In a tympan gage the combination of the sliding block having a transverse channel thereacross open throughout its length on the upper side of the block, a screw member on the block beside the channel projected thereabove, a member on the screw projecting over the slot for movement theretoward under rotation, and a gage including a stem slidable in the channel and of a thickness greater than the depth of the channel.

In testimony whereof I affix my signature in presence of two witnesses.

ARTHUR B. RAGER.

Witnesses:
 OTTO G. KEICH,
 LOUIS W. BARR.